UNITED STATES PATENT OFFICE.

JAMES WILLIAM BUTLER, OF HUMBER ROAD, BLACKHEATH, COUNTY OF KENT, ENGLAND.

COMPOSITION FOR THE MANUFACTURE OF BLOCKS FOR CONTAINING ELECTRIC WIRES OR CABLES.

SPECIFICATION forming part of Letters Patent No. 352,445, dated November 9, 1886.

Application filed July 6, 1886. Serial No. 207,234. (No specimens.) Patented in England February 2, 1886, No. 1,538.

*To all whom it may concern:*

Be it known that I, JAMES WILLIAM BUTLER, a subject of the Queen of Great Britain and Ireland, and residing at Humber Road, Blackheath, in the county of Kent, England, have invented a new and useful Composition for the Manufacture of Blocks for Containing Electric Wires or Cables, and for other electrical purposes, (for which I have applied for Letters Patent in Great Britain, No. 1,538, February 2, 1886;) and I do hereby declare that the following is a full, clear, and exact description of the invention, which will enable others skilled in the art to which it appertains to make and use the same.

My invention relates to a material or composition capable of being used for the manufacture of blocks or receptacles for containing electric wires or cables, say, for example, when laid under ground, and for other electrical purposes, among which purposes may be mentioned the frames or supports of secondary batteries and pole-insulators, and generally the use of the material or composition as a substitute for vulcanite and equivalent substances where it may be applicable.

In carrying out my invention, I use the following ingredients in, say, about the under-mentioned proportions, which, however, may be varied according to circumstances, viz: Trinidad or other bitumen, fifteen pounds; crude paraffine, twelve ounces; compound silicate of lime and alumina, (commonly called "Portland cement,") six ounces; Aylesford or similar sand or finely-powdered limestone, eight pounds; roughly-pulped wood, eight pounds; Taranaki sand, eight ounces.

In preparing the material or composition with the use of these ingredients, the bitumen and paraffine are mixed together and boiled for, say, about one hour, and the pulped wood is then gradually added while stirring the mixture and maintaining it at or near the boiling-point. The Aylesford or other similar sand or finely-powdered limestone (previously heated to a temperature of, say, about 200° Fahrenheit) is then gradually introduced, after which the mixture previously prepared of the compound silicate of lime and alumina (Portland cement) and the Taranaki sand is gradually worked in while continuing to stir and maintain the whole at or near the boiling-point. The order or sequence in which the several ingredients are introduced may be somewhat varied without detriment. For example, the pulped wood may be introduced after the heated Aylesford or other similar sand or finely-powdered limestone is added to the boiling mixture of bitumen and paraffine in lieu of before; but in all cases I have found it desirable to introduce the mixture of compound silicate of lime and alumina (Portland cement) and Taranaki sand after the whole of the other ingredients have been intimately mixed together, so as to become thoroughly incorporated.

In some cases the Taranaki sand may be dispensed with, and in place of pulped wood I may use sawdust or tan-yard waste where it can be readily obtained.

In molding the material or composition for the various purposes to which it is to be applied, it is introduced when in a heated condition into molds of the required shape, and tamped down with hot irons, and when sufficiently set the articles so made are removed from the molds and will be ready for use.

When the receptacles for containing electric wires or cables made of this material or composition, and other similar articles for electrical purposes are required to be formed on the curve, they may be molded in a rectilinear form and bent when in a warm condition so as to follow the sinuosities of the curvature desired.

Having fully described my invention, what I desire to claim, and secure by Letters Patent, is—

The material or composition capable of being used for the manufacture of blocks or receptacles for containing electric wires or cables, and for other electrical purposes, as described, which consists of Trinidad or other bitumen, crude paraffine, compound silicate of lime and alumina, (commonly called "Portland cement,") Aylesford or similar sand or finely-powdered limestone, and roughly-pulped wood or sawdust or tan-yard waste, in conjunction or not with Taranaki sand, the whole employed in or about in the proportions before mentioned, all substantially as herein set forth.

In testimony whereof I have signed my name to this specification in the presence of two subscribing witnesses.

JAMES WILLIAM BUTLER.

Witnesses:
THOMAS JOHN HANDFORD,
ALFRED JOHN MAXWELL,
  Both of 50 Bedford Row, London.